United States Patent
Peri et al.

(10) Patent No.: US 11,960,345 B2
(45) Date of Patent: Apr. 16, 2024

(54) SYSTEM AND METHOD FOR CONTROLLING OPERATIONAL MODES FOR XR DEVICES FOR PERFORMANCE OPTIMIZATION

(71) Applicant: Samsung Electronics Co., Ltd., Suwon-si (KR)

(72) Inventors: Christopher A. Peri, Mountain View, CA (US); Moiz Kaizar Sonasath, San Jose, CA (US); Lu Luo, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/750,960

(22) Filed: May 23, 2022

(65) Prior Publication Data

US 2022/0382356 A1    Dec. 1, 2022

Related U.S. Application Data

(60) Provisional application No. 63/192,957, filed on May 25, 2021.

(51) Int. Cl.
*G06F 1/329* (2019.01)
*G06F 1/3212* (2019.01)
*G06F 1/3218* (2019.01)

(52) U.S. Cl.
CPC ............ *G06F 1/329* (2013.01); *G06F 1/3212* (2013.01); *G06F 1/3218* (2013.01)

(58) Field of Classification Search
CPC ...... G06F 1/3212; G06F 1/3218; G06F 1/329; G06F 1/163; G06F 1/3203; G06F 1/3206;
(Continued)

(56) References Cited

U.S. PATENT DOCUMENTS 7,272,730 B1    9/2007  Acquaviva et al.
7,788,384 B1    8/2010  Rubinstein
(Continued)

FOREIGN PATENT DOCUMENTS

CN    105827953 A    8/2016
CN    109856800 A    6/2019
(Continued)

OTHER PUBLICATIONS

International Search Report and Written Opinion of the International Searching Authority dated Sep. 2, 2022 in connection with International Application No. PCT/KR2022/007428, 9 pages.

*Primary Examiner* — Chun Cao

(57) ABSTRACT

A method includes obtaining a request for one of multiple operational modes from an application installed on an extended reality (XR) device or an XR runtime/renderer of the XR device. The method also includes selecting a first mode of the operational modes, based at least partly on a real-time system performance of the XR device. The method also includes publishing the selected first mode to the XR runtime/renderer or the application. The method also includes performing a task related to at least one of image rendering or computer vision calculations for the application, using an algorithm associated with the selected first mode.

20 Claims, 9 Drawing Sheets

(58) Field of Classification Search
CPC ...... G06F 1/325; G06F 1/3265; G06F 1/3287; G06F 3/011
USPC .......................................................... 713/320
See application file for complete search history.

(56) References Cited

U.S. PATENT DOCUMENTS

| | | |
|---|---|---|
| 9,401,048 B2 | 7/2016 | Maciocci et al. |
| 9,609,601 B2 | 3/2017 | Kim et al. |
| 9,952,433 B2 | 4/2018 | Um et al. |
| 10,127,290 B1 | 11/2018 | Armstrong et al. |
| 10,578,879 B2 | 3/2020 | Carollo et al. |
| 10,705,602 B2 | 7/2020 | Poulos et al. |
| 10,768,695 B2 | 9/2020 | Ranganathan et al. |
| 10,819,844 B2 | 10/2020 | Kim et al. |
| 10,841,567 B2 | 11/2020 | Zhou et al. |
| 11,144,091 B2 | 10/2021 | Wang et al. |
| 11,195,339 B2 | 12/2021 | Hill, II et al. |
| 2003/0158609 A1 | 8/2003 | Chiu |
| 2016/0131904 A1 | 5/2016 | Border et al. |
| 2017/0006742 A1 | 1/2017 | Kawase et al. |
| 2017/0092235 A1* | 3/2017 | Osman ................ G06F 3/16 |
| 2018/0240220 A1* | 8/2018 | Katori ................ G06T 7/70 |
| 2019/0075288 A1 | 3/2019 | Zhou et al. |
| 2020/0128056 A1 | 4/2020 | Simotas et al. |
| 2020/0249748 A1 | 8/2020 | Ranganathan et al. |
| 2020/0249749 A1* | 8/2020 | Akman ............ G06F 3/04815 |
| 2020/0379553 A1 | 12/2020 | Mor |
| 2021/0018292 A1 | 1/2021 | Formwalt |
| 2021/0132678 A1 | 5/2021 | An |

FOREIGN PATENT DOCUMENTS

| | | |
|---|---|---|
| KR | 101803532 B1 | 12/2017 |
| KR | 20180010555 A | 1/2018 |
| KR | 20180097072 A | 8/2018 |
| KR | 10-2021-0056570 A | 5/2021 |
| KR | 10-2367492 B1 | 2/2022 |
| WO | 2018127169 A1 | 7/2018 |
| WO | 2018232785 A1 | 12/2018 |
| WO | 2020264088 A1 | 12/2020 |

\* cited by examiner

| Op-mode | Name | Description |
|---|---|---|
| Mode 1 | HUD | While in HUD mode, the device will not perform tracking with possible exception to simple hand gestures. |
| Mode 2 | 2D | Display 2D applications and Desktop |
| Mode 3 | Media | Media mode is reserved for display pre-recorded moving media. Mono and Stereo. |
| Mode 4 | Desktop AR | Desktop AR mode is designated for 3D world locked experience where the targeted area is limited in size. This mode will also support 3D avatars and volumetric video. |
| Mode 5 | Room MR | Room scale MR supports full comprehension and tracking. Max distance of N meters. |
| Mode 6 | Area MR | Large room scale MR. Max distance of M meters. |
| Mode 7 | Outside MR | Outdoor support. |

FIG. 6

| Selected Op-mode | Resolution | Runtime | Head Tracking | Hand Tracking | Eye Tracking | LSR | Detection Range | Mapping | Keyboard view |
|---|---|---|---|---|---|---|---|---|---|
| Hud: 1 | 1K Mono | =>15 fps | | | | | | | |
| Desktop: 4 | 2K Mono | =>30 | 3 DoF | Simple | | 2D planer | <=10m | | on |
| Outside: 7 | 2K stereo | =>45 | 6 DoF | Detailed | on | =>90 fps | <=40m | on | |

FIG. 7

SYSTEM AND METHOD FOR CONTROLLING OPERATIONAL MODES FOR XR DEVICES FOR PERFORMANCE OPTIMIZATION

CROSS-REFERENCE TO RELATED APPLICATION AND PRIORITY CLAIM

This application claims priority under 35 U.S.C. § 119(e) to U.S. Provisional Patent Application No. 63/192,957 filed on May 25, 2021, which is hereby incorporated by reference in its entirety.

TECHNICAL FIELD

This disclosure relates generally to extended reality (XR) platforms. More specifically, this disclosure relates to a system and method for controlling operational modes for XR devices for performance optimization and/or power preservation.

BACKGROUND

Extended reality (XR) experiences, encompassing augmented reality (AR), virtual reality (VR), and mixed reality (MR) experiences, incorporate digitally controlled content into a user's view of an operating environment (e.g., a real-world environment) through an XR apparatus (for example, a head-mounted display) present unique challenges in terms of presenting images from real world and digital sources. Extended reality devices may display a combination of images from the real world and images from the virtual world.

Current XR systems are designed to perform a task to cover predetermined use cases. There are also software systems that are designed to perform a task at a predetermined key performance indicator (KPI), which may or may not be appropriate as the use case changes. However, there are currently no solutions that allow identification and communication of a specific use case, and thus allow all systems, whether native or third party, to modify their processes to save power, improve performance, or both.

SUMMARY

This disclosure provides a system and method for controlling operational modes for XR devices for performance optimization and/or power preservation.

In a first embodiment, a method includes obtaining a request for one of multiple operational modes from an application installed on an extended reality (XR) device or an XR runtime/renderer of the XR device. The method also includes selecting a first mode of the operational modes, based at least partly on a real-time system performance of the XR device. The method also includes publishing the selected first mode to the XR runtime/renderer or the application. The method also includes performing a task related to at least one of image rendering or computer vision calculations for the application, using an algorithm associated with the selected first mode.

In a second embodiment, an electronic device includes at least one memory configured to store instructions. The electronic device also includes a processor configured when executing the instructions to obtain a request for one of multiple operational modes from an application installed on an XR device or an XR runtime/renderer of the XR device; select a first mode of the operational modes, based at least partly on a real-time system performance of the XR device; publish the selected first mode to the XR runtime/renderer or the application; and perform a task related to at least one of image rendering or computer vision calculations for the application, using an algorithm associated with the selected first mode.

In a third embodiment, a non-transitory computer readable medium contains computer readable program code that, when executed, causes at least one processor of an electronic device to obtain a request for one of multiple operational modes from an application installed on an XR device or an XR runtime/renderer of the XR device; select a first mode of the operational modes, based at least partly on a real-time system performance of the XR device; publish the selected first mode to the XR runtime/renderer or the application; and perform a task related to at least one of image rendering or computer vision calculations for the application, using an algorithm associated with the selected first mode.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smart phone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which:

FIG. 6 illustrates a table showing examples of operational mode definitions according to this disclosure;

FIG. 7 illustrates a table showing examples of how a hardware component may choose to modify its behavior based on a selected operational mode according to this disclosure;

DETAILED DESCRIPTION

Figure 1:
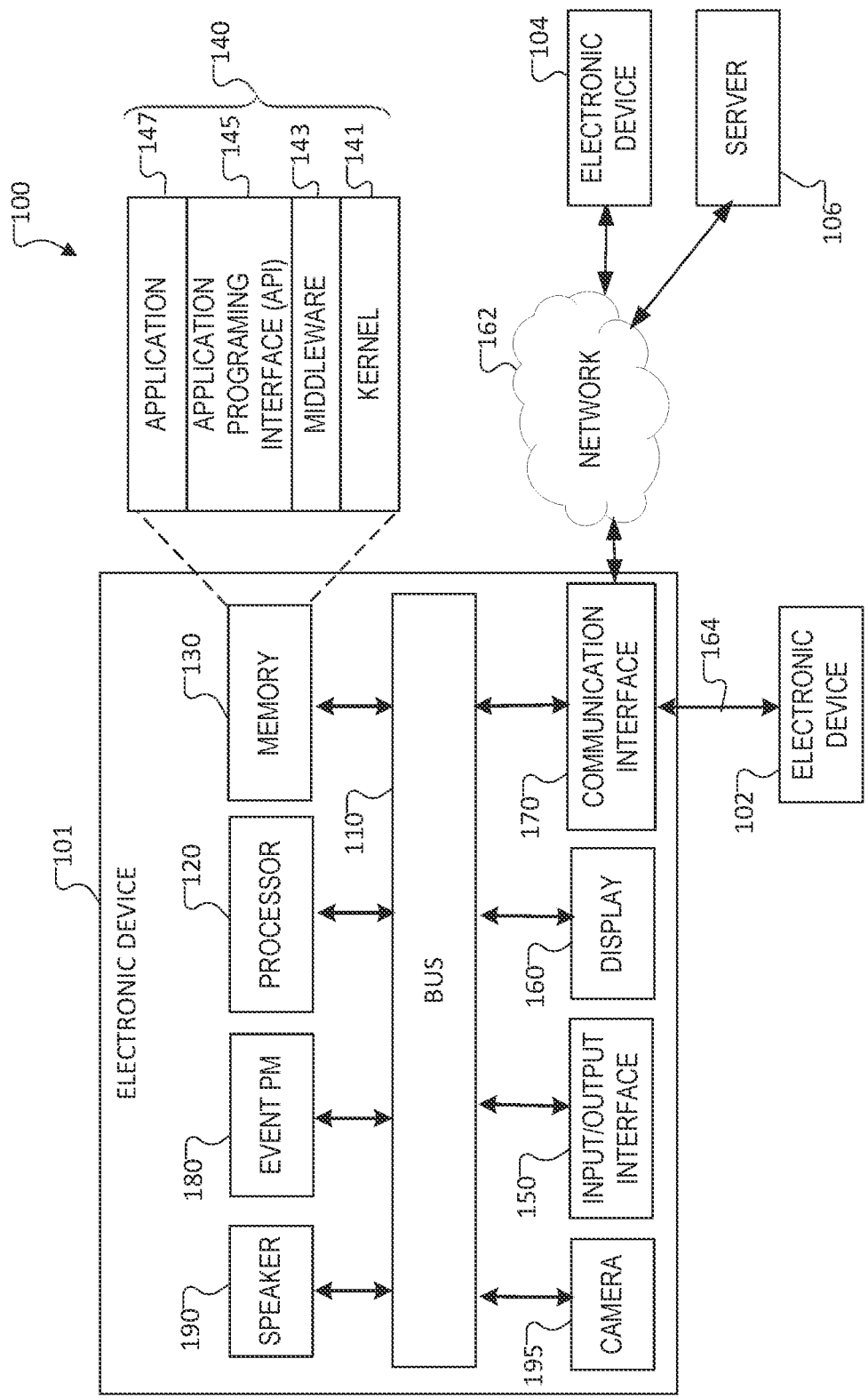
FIG. 1 illustrates an example network configuration including an electronic device according to this disclosure.

The figures discussed below and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

As discussed above, current XR systems are designed to perform a task to cover predetermined use cases. There are also software systems that are designed to perform a task at a predetermined KPI, which may or may not be appropriate as the use case changes. However, there are currently no solutions that allow identification and communication of a specific use case, and thus allow all systems, whether native or third party, to modify their processes to save power, improve performance, or both.

Many current AR devices have a number of sensors and solutions that allow the device to perform 6 degree of freedom (DoF) head and hand tracking, fully map the environment, as well as perform AI based object, face and sometimes body detection, all while maintaining a high frame rate. Many of these sensors are optically based and sense and receive information wirelessly, which can consume quite a bit of power. These sensors, and the computing power required to support them, place a significant load on the battery with wireless AR devices. In addition, running these systems can generate significant heat, which in turn requires additional cooling solutions. Moreover, some solutions engage remote computing, which can involve further costs in power and heat. In addition, certain situations may require different levels of sensor and computing performance that may not result in a saving of power, but instead require a high KPI to satisfy.

To minimize these issues, it is desired to only execute those systems that are required for the use case employed at the time. However, conventional HMDs do not typically know what the current use case is. Moreover, any remote computing device or handheld device associated with the HMD also does not know what the current use case is. Furthermore, not all computing devices and HMD are the same, so simply instructing a device to turn off or on a particular sensor or service is not practicable. Further, there are situations where, instead of saving power, it is desired or necessary to increase the tracking resolution or computational accuracy when the use case allows. For example, when mapping a very small area, it may be preferable to increase the resolution, camera speed, and use different computational solutions to attain a superior output.

To address these and other issues, embodiments of this disclosure provide systems and methods for controlling operational modes for XR devices for performance optimization and/or power preservation. The disclosed embodiments enable efficient communication—to the remote computing device/service, the HMD, and any third party peripheral devices—of what class of service is required such that the systems themselves can determine the most optimal way to support that use case class. The disclosed embodiments are extensible enough to allow almost any rendering system, be it a nearby computer or cloud based solution, to work with almost any HMD device and accessories.

The disclosed embodiments enable the application, a remote computer, and any external devices (e.g., a HMD) to work together in a certain configuration, referred to herein as an "operational mode." The operational modes are defined based on the general goal of the use case, such that each component of the AR solution can optimize for power and/or performance while still ensuring that the KPI for each use case is satisfied. For example, if the application is calling for a simple HUD like display, then HMD camera tracking systems can be turned off, image transfer resolution and color depth can be lowered, and hand tracking algorithms can be turned off.

Note that while some of the embodiments discussed below are described in the context of consumer electronic devices (e.g., XR headsets), this is merely one example. It will be understood that the principles of this disclosure may be implemented in any number of other suitable devices or contexts.

FIG. 1 illustrates an example network configuration 100 according to this disclosure. The embodiment of the network configuration 100 shown in FIG. 1 is for illustration only. Other embodiments could be used without departing from the scope of this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. The electronic device 101 may also include a speaker 190 and camera 195. In some embodiments, the electronic device 101 may exclude at least one of the components or may add another component.

In certain embodiments, electronic device 101 is operating as a platform for providing an XR experience according to some embodiments of this disclosure. According to various embodiments of this disclosure, electronic device 101 could be implemented as one or more of a smartphone, a tablet, or a head-mounted device (HMD) for providing an augmented reality (AR) experience. In some embodiments, electronic device 101 is a wearable device. In certain embodiments, electronic device 101 is configured to couple to a second electronic device 102, which may be a wearable device such as an HMD.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 145 may include at least one interface or function (such as a command) for file control, window control, image processing, or text control.

The applications 147 can include games, social media applications, applications for geotagging photographs and other items of digital content, extended reality (XR) applications, operating systems, device security (e.g., anti-theft and device tracking) applications or any other applications which access resources of electronic device 101, the resources of electronic device 101 including, without limitation, speaker 190, microphone, input/output interface 150, and additional resources.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device. The communication interface 170 may include, for example, a radio frequency (RF) transceiver, a Bluetooth transceiver, or a wireless fidelity (Wi-Fi) transceiver, and the like.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The camera 195 can be configured to capture still or moving images. For example, the camera 195 can capture a single frame or multiple frames. In certain embodiments, the camera 195 is a single camera. In certain embodiments, the camera 195 is an imaging system that includes multiple cameras. In certain embodiments, the camera 195 comprises a camera disposed beneath the display 160, namely an under-display camera (UDC).

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
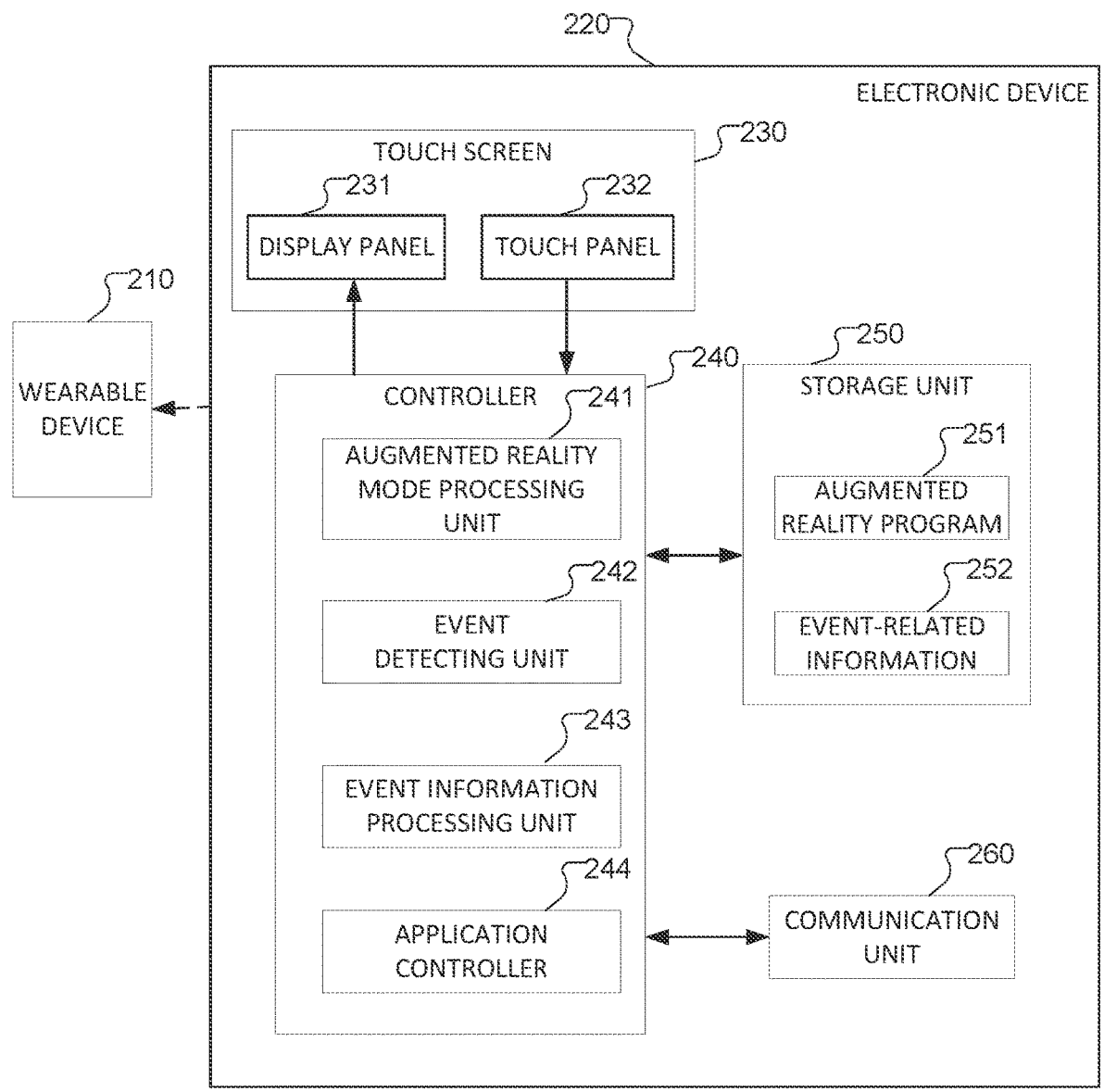
FIG. 2 illustrates an example electronic device according to this disclosure.

FIG. 2 illustrates an example electronic device 220 according to various embodiments of the present disclosure. The embodiment of the electronic device 220 shown in FIG. 2 is for illustration only. Other embodiments of electronic device 220 could be used without departing from the scope of this disclosure. The electronic device 220 depicted in FIG. 2 can be configured the same as, or similar to, any of electronic devices 101, 102, or 104.

According to certain embodiments, the electronic device 220 can include at least one of a touchscreen 230, a controller 240, a storage unit 250, or a communication unit 260. The touchscreen 230 can include a display panel 231 and/or a touch panel 232. The controller 240 can include at least one of an augmented reality mode processing unit 241, an event detecting unit 242, an event information processing unit 243, or an application controller 244.

In certain embodiments, an electronic device 220 is an HMD that includes display or touchscreen 230. In certain embodiments, the electronic device 220 includes display panel 231 without a touch screen option. According to various embodiments, the display panel 231 can display, in an internally facing direction, items of XR content in conjunction with views of objects in an externally facing field of view. According to some embodiments, the display panel 231 is substantially transparent (similar to, for example, the displays used in "smart glasses" or "heads-up displays" on the cockpit glass of an airplane) and views of objects in externally facing fields of view come from light passing through display. According to various embodiments, (sometimes referred to as "mixed reality") the display panel 231 is opaque, and views of objects in externally facing fields of view come from image data from externally oriented cameras (for example, externally oriented camera 195).

In certain embodiments, when the electronic device 220 is mounted in a wearable device 210, the electronic device 220 can operate, e.g., as an HMD, and run an augmented reality mode. Further, according to an embodiment of the present disclosure, even when the electronic device 220 is not mounted in the wearable device 210, the electronic device 220 can run the augmented reality mode according to the user's settings or run an augmented reality mode related application. In the following embodiment, although the electronic device 220 is set to be mounted in the wearable device 210 to run the augmented reality mode, embodiments of the present disclosure are not limited thereto.

According to certain embodiments, when the electronic device 220 operates in the augmented reality mode (e.g., the electronic device 220 is mounted in the wearable device 210 to operate in a head mounted theater (HMT) mode), two screens corresponding to the user's eyes (left and right eye) can be displayed through the display panel 231.

According to certain embodiments, when the electronic device 220 is operated in the augmented reality mode, the controller 240 can control the processing of information related to an event generated while operating in the augmented reality mode to fit in the augmented reality mode and display the processed information. According to certain embodiments, when the event generated while operating in the augmented reality mode is an event related to running an application, the controller 240 can block the running of the application or process the application to operate as a background process or application.

More specifically, according to an embodiment of the present disclosure, the controller 240 can include at least one of an augmented reality mode processing unit 241, an event detecting unit 242, an event information processing unit 243, or an application controller 244 to perform functions according to various embodiments of the present disclosure. An embodiment of the present disclosure can be implemented to perform various operations or functions as described below using at least one component of the electronic device 220 (e.g., the touchscreen 230, controller 240, or storage unit 250).

According to certain embodiments, when the electronic device 220 is mounted in the wearable device 210 or the augmented reality mode is run according to the user's setting or as an augmented reality mode-related application runs, the augmented reality mode processing unit 241 can process various functions related to the operation of the augmented reality mode. The augmented reality mode processing unit 241 can load at least one augmented reality program 251 stored in the storage unit 250 to perform various functions.

The event detecting unit 242 determines or detects that an event is generated while operated in the augmented reality mode by the augmented reality mode processing unit 241. Further, the event detecting unit 242 can determine whether there is information to be displayed on the display screen in relation with an event generated while operating in the augmented reality mode. Further, the event detecting unit 242 can determine that an application is to be run in relation with an event generated while operating in the augmented reality mode. Various embodiments of an application related to the type of event are described below.

The event information processing unit 243 can process the event-related information to be displayed on the display screen to fit the augmented reality mode when there is information to be displayed in relation with an event occurring while operating in the augmented reality mode depending on the result of determination by the event detecting unit 242. Various methods for processing the event-related information can apply. For example, when a three-dimensional (3D) image is implemented in the augmented reality mode, the electronic device 220 converts the event-related information to fit the 3D image. For example, event-related information being displayed in two dimensions (2D) can be converted into left and right eye information corresponding to the 3D image, and the converted information can then be synthesized and displayed on the display screen of the augmented reality mode being currently run.

When it is determined by the event detecting unit 242 that there is an application to be run in relation with the event occurring while operating in the augmented reality mode, the application controller 244 performs control to block the running of the application related to the event. According to certain embodiments, when it is determined by the event detecting unit 242 that there is an application to be run in relation with the event occurring while operating in the augmented reality mode, the application controller 244 can perform control so that the application is run in the background so as not to influence the running or screen display of the application corresponding to the augmented reality mode when the event-related application runs.

The storage unit 250 can store an augmented reality program 251. The augmented reality program 251 can be an application related to the augmented reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

The wearable device 210 can be an electronic device including at least one function of the electronic device 101 shown in FIG. 1, and the wearable device 210 can be a wearable stand to which the electronic device 220 can be mounted. In case the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether to be mounted on the wearable device 210 for communication with the wearable device 210 and can determine whether to operate in the augmented reality mode (or an HMT mode).

According to certain embodiments, upon failure to automatically determine whether the electronic device 220 is mounted when the communication unit 260 is mounted on the wearable device 210, the user can apply various embodiments of the present disclosure by running the augmented reality program 251 or selecting the augmented reality mode (or, the HMT mode). According to an embodiment of the present disclosure, when the wearable device 210 functions with or as part the electronic device 101, the wearable device can be implemented to automatically determine whether the electronic device 220 is mounted on the wearable device 210 and enable the running mode of the electronic device 220 to automatically switch to the augmented reality mode (or the HMT mode).

At least some functions of the controller 240 shown in FIG. 2 can be included in the event processing module 180 or processor 120 of the electronic device 101 shown in FIG. 1. The touchscreen 230 or display panel 231 shown in FIG. 2 can correspond to the display 160 of FIG. 1. The storage unit 250 shown in FIG. 2 can correspond to the memory 130 of FIG. 1.

Although in FIG. 2 the touchscreen 230 includes the display panel 231 and the touch panel 232, according to an embodiment of the present disclosure, the display panel 231 or the touch panel 232 may also be provided as a separate panel rather than being combined in a single touchscreen 230. Further, according to an embodiment of the present disclosure, the electronic device 220 can include the display panel 231 but exclude the touch panel 232.

According to certain embodiments, the electronic device 220 can be denoted as a first device (or a first electronic device), and the wearable device 210 may be denoted as a second device (or a second electronic device) for ease of description.

Although FIG. 2 illustrates one example of an electronic device 220, various changes may be made to FIG. 2. For example, various components in FIG. 2 could be combined, further subdivided, or omitted and additional components could be added according to particular needs. Also, as with computing and communication networks, electronic devices can come in a wide variety of configurations and FIG. 2 does not limit this disclosure to any particular electronic device.

Figure 3:
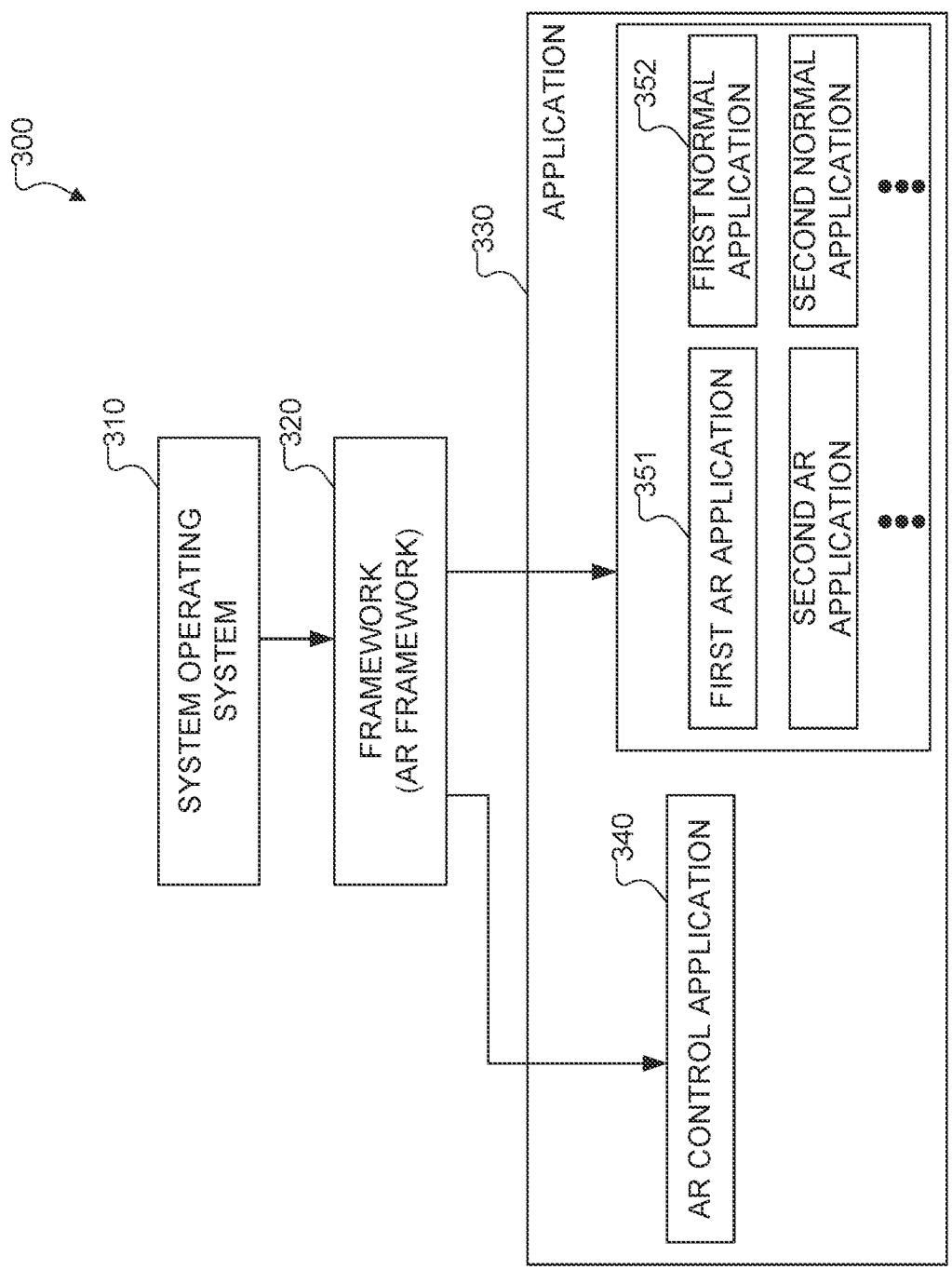
FIG. 3 illustrates an example program module according to this disclosure.
Figure 4A:
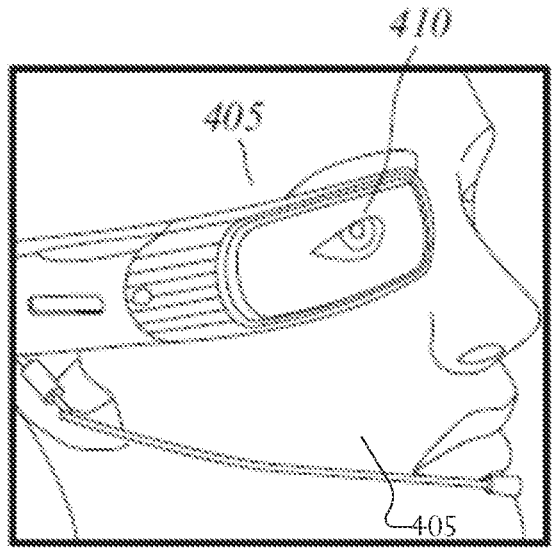
FIGS. 4A-4D illustrate examples of a head mounted display (HMD) for use in augmented reality, mixed reality, extended reality, or virtual reality according to this disclosure.
Figure 4B:
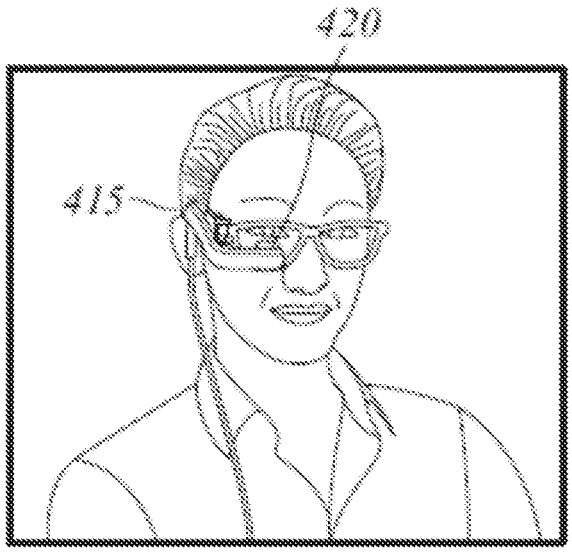
Figure 4C:
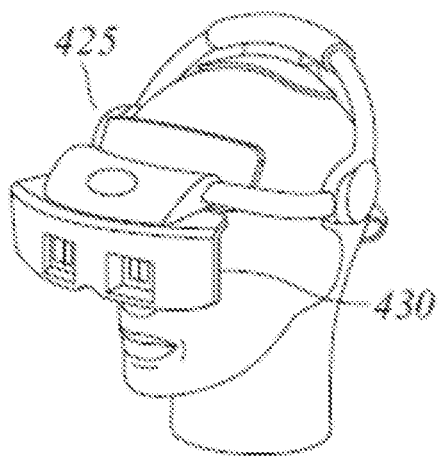
Figure 4D:
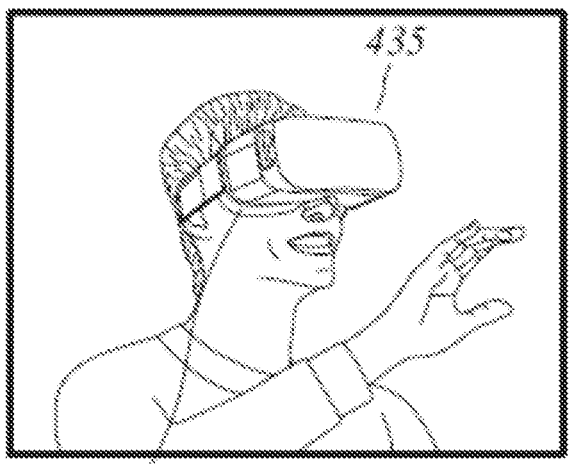

FIG. 3 illustrates an example program module 300 according to this disclosure. The embodiment illustrated in FIG. 3 is for illustration only and other embodiments could be used without departing from the scope of this disclosure. In the example shown in FIG. 3, although an augmented reality (AR) system is depicted, at least some embodiments of this disclosure apply equally to virtual reality (VR), extended reality (XR), or mixed reality. Referring to FIG. 3, the program module 300 can include a system operating system (e.g., an OS) 310, a framework 320, and an application 330.

The system operating system 310 can include at least one system resource manager or at least one device driver. The system resource manager can perform, for example, control, allocation, or recovery of the system resources. The system resource manager may include at least one manager, such as a process manager, a memory manager, or a file system manager. The device driver may include at least one driver, such as, for example, a display driver, a camera driver, a Bluetooth driver, a shared memory driver, a USB driver, a keypad driver, a Wi-Fi driver, an audio driver, or an inter-process communication (IPC) driver.

According to certain embodiments, the framework 320 (e.g., middleware) can provide, for example, functions commonly required by an application or provide the application with various functions through an application programming interface (API) to allow the application to efficiently use limited system resources inside the electronic device.

The AR framework included in the framework 320 can control functions related to augmented reality mode operations on the electronic device. For example, when running an augmented reality mode operation, the AR framework 320 can control at least one AR application 351, which is related to augmented reality, among applications 330 to provide the augmented reality mode on the electronic device.

The application 330 can include a plurality of applications and can include at least one AR application 351 running in the augmented reality mode and at least one normal application 352 running in a non-augmented reality mode, which is not the augmented reality mode.

The application 330 can further include an AR control application 340. An operation of the at least one AR application 351 and/or at least one normal application 352 can be controlled under the control of the AR control application 340.

When at least one event occurs while the electronic device operates in the augmented reality mode, the system operating system 310 can notify the framework 320, for example the AR framework, of an occurrence of an event.

The framework 320 can then control the running of the normal application 352 so that event-related information can be displayed on the screen for the event occurring in the non-augmented reality mode, but not in the augmented reality mode. When there is an application to be run in relation with the event occurring in the normal mode, the framework 320 can perform or provide control to run at least one normal application 352.

According to certain embodiments, when an event occurs while operating in the augmented reality mode, the framework 320, for example the AR framework, can block the operation of at least one normal application 352 to display the information related to the occurring event. The framework 320 can provide the event occurring, while operating in the augmented reality mode, to the AR control application 340.

The AR control application 340 can process the information related to the event occurring while operating in the augmented reality mode to fit within the operation of the augmented reality mode. For example, a 2D, planar event-related information can be processed into 3D information.

The AR control application 340 can control at least one AR application 351 currently running and can perform control to synthesize the processed event-related information for display on the screen being run by the AR application 351 and display the result of the event related information thereon.

According to certain embodiments, when an event occurs while operating in the augmented reality mode, the framework 320 can perform control to block the running of at least one normal application 352 related to the occurring event.

According to certain embodiments, when an event occurs while operating in the augmented reality mode, the framework 320 can perform control to temporarily block the running of at least one normal application 352 related to the occurring event, and then when the augmented reality mode terminates, the framework 320 can perform control to run the blocked normal application 352.

According to certain embodiments, when an event occurs while operating in the augmented reality mode, the framework 320 can control the running of at least one normal application 352 related to the occurring event so that the at least one normal application 352 related to the event operates on the background so as not to influence the screen by the AR application 351 currently running.

Embodiments described in connection with FIG. 3 are examples for implementing an embodiment of the present disclosure in the form of a program, and embodiments of the present disclosure are not limited thereto and rather can be implemented in other various forms. Further, while the embodiment described in connection with FIG. 3 references AR, it can be applied to other scenarios such as mixed reality, or virtual reality etc. Collectively the various reality scenarios can be referenced herein as extended reality (XR).

Various examples of aspects of a user interface (UI) for XR scenarios are disclosed herein. It should be noted that aspects of XR UIs disclosed herein are merely examples of XR UIs and are not intended to be limiting.

There are different types of display elements that can be used in XR scenarios. For example, displayed elements are either tied directly to the real world or tied loosely to the XR display space. In world elements are elements that move in relation to the real or virtual environment itself (i.e., move in relation to the environment itself). Depending on the object, in world elements may not necessarily move in relation to the user's head when wearing a head mounted display (HMD).

Heads up display (HUD) elements are elements wherein users can make small head movements to gaze or look directly at various application (app) elements without moving the HUD elements container or UI panel in the display view. HUD elements can be a status bar or UI by which information is visually displayed to the user as part of the display.

FIGS. 4A-4D illustrate examples of a head mounted display (HMD) for use in augmented reality, mixed reality, extended reality, or virtual reality according to this disclosure. The embodiments of the HMDs shown in FIGS. 4A-4D are for illustration only and other configurations could be used without departing from the scope of the present disclosure.

The HMD can generate an augmented reality environment in which a real-world environment is rendered with augmented information. The HMD can be monocular or binocular and can be an opaque, transparent, semi-transparent, or reflective device. For example, the HMD can be a monocular electronic device 405 having a transparent screen 410. A user is able to see through the screen 410 as well as able to see images rendered, projected or displayed on the screen 410. The images may be projected onto the screen 410, generated or rendered by the screen 410 or reflected on the screen 410. In certain embodiments, the HMD is a monocular electronic device 415 having an opaque or non-see-through display 420. The non-see-through display 420 can be a liquid crystal display (LCD), a Light emitting diode (LED), active-matrix organic light emitting diode (AMO- LED), or the like. The non-see-through display 420 can be configured to render images for viewing by the user. In certain embodiments, the HMD can be a binocular electronic device 425 having a transparent screen 430. The transparent screen 430 can be a single contiguous screen, such as adapted to be viewed by, or traverse across, both eyes of the user. The transparent screen 430 also can be two transparent screens in when one screen is disposed corresponding to a respective eye of the user. The user is able to see through the screen 430 as well as able to see images rendered, projected or displayed on the screen 430. The images may be projected onto the screen 430, generated or rendered by the screen 430 or reflected on the screen 430. In certain embodiments, the HMD is a binocular electronic device 435 having an opaque or non-see-through display 440. The HMD can include a camera or camera input configured to capture real-world information and display, via the non-see-through display 440, real-world information. The non-see-through display 440 can be an LCD, LED, AMOLED, or the like. The non-see-through display 440 can be configured to render images for viewing by the user. The real-world information captured by the camera can be rendered as a video image on the display with augmented information.

Figure 5:
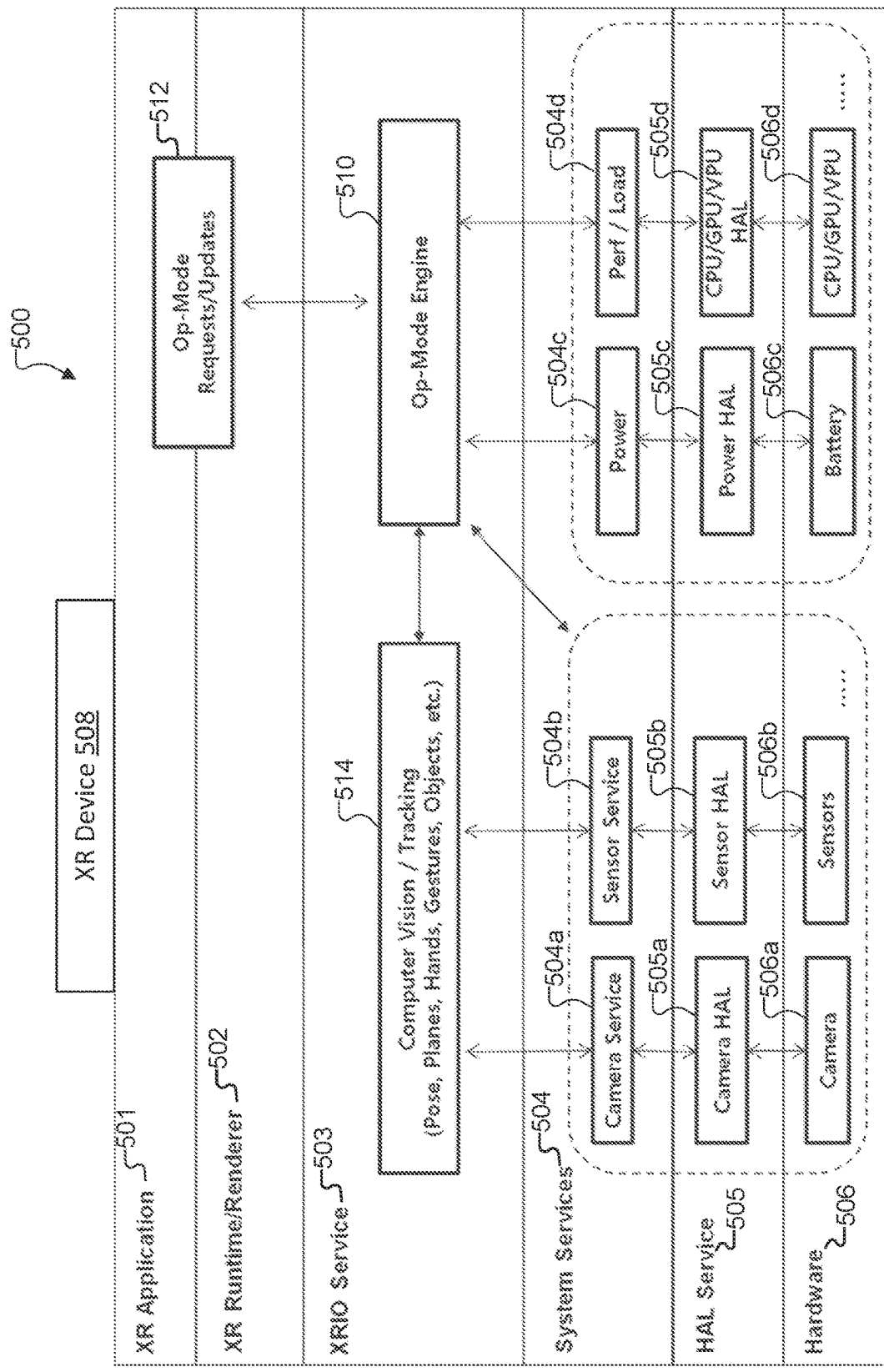
FIG. 5 illustrates an example framework for controlling operational modes for XR devices for performance optimization and/or power preservation according to this disclosure.

FIG. 5 illustrates an example framework 500 for controlling operational modes for XR devices for performance optimization and/or power preservation according to this disclosure. For ease of explanation, the framework 500 is described as being implemented using one or more components of the network configuration 100 described above, such as the electronic device 101. However, this is merely one example, and the framework 500 could be implemented using any other suitable device(s) or component(s).

As shown in FIG. 5, the framework 500 is implemented in a software stack for an XR device 508 that includes an XR application 501, an XR runtime/renderer 502, an XR input/output (XRIO) service 503, multiple system services 504, multiple hardware abstraction layer (HAL) services 505, and multiple hardware components 506. The system services 504 includes various services for operating the XR device 508 and its components, such as a camera service 504*a*, a sensor service 504*b*, a power service 504*c*, and a performance/load service 504*d*. Other suitable system services 504 are possible and within the scope of this disclosure. The hardware components 506 include various hardware components that are used in the XR device 508, such as a camera 506*a*, sensors 506*b*, a battery 506*c*, and processors 506*d* (e.g., CPU, GPU, VPU, and the like). The HAL services 505 include various services for communicating with or controlling the hardware components 506. Example HAL services include a camera HAL service 505*a*, a sensor HAL service 505*b*, a battery HAL service 505*c*, and a processor HAL service 505*d*.

The framework 500 also includes an op-mode engine 510. The op-mode engine 510 is configured to control which operation mode the XR device 508 functions in at any given time. Operation modes (or "op-modes" for short) are externally defined modes in which XR components can operate, and can relate to the components' use of XR functions, power management, the environment in which the XR components operate, and the like. For example, each op-mode can define power and performance quality management for multiple tasks 514 related to image rendering and/or computer vision calculations in the XR device 508 (e.g., pose, planes, hands, gestures, objects, and the like). In some embodiments, the op-mode engine 510 is part of the XRIO service 503, which is responsible for moving XR data to the XR runtime/renderer 502 and hence to the XR application 501.

FIG. 6 illustrates a table 600 showing examples of op-mode definitions according to this disclosure. As shown in FIG. 6, the table 600 includes a list of op-modes 601 with corresponding op-mode names 602 and descriptions 603. The op-modes 601 represent possible op-modes in which an XR component could operate. For example, a HMD could operate in any of Mode 1 through Mode 7. In some embodiments, the list of op-modes 601 is standardized for use in multiple applications, algorithms, and components associated with XR devices. As used herein, standardization of op-modes 601 refers to an agreed definition of one or more use case parameters such that multiple application developers, product manufacturers, and the like, have a shared understanding of expected performance requirements for each defined op-mode 601. For example, for each op-mode 601, there may be a minimum KPI that the op-mode 601 must support. As a particular example, Mode 4 may require a certain level of accuracy for detecting surfaces. If an XR component cannot meet this KPI, then the XR component cannot support Mode 4. While seven op-modes 601 are shown in the table 600, this is merely one example. Other numbers of op-modes (which can include op-modes not shown in table 600) are possible. Also, the definition of each op-mode 601 can include other types of information, such as KPI information.

In some embodiments, the op-modes 601 are dynamic and can be added, removed, or changed over time. Read and write permissions to each op-mode 601 can be managed offline, such as by a developer or system engineer. Each XR device or component that subscribes to the use of op-modes can have a listener to check for changes to the list of op-modes 601. In some embodiments, the developer of each XR component is responsible for managing that component based on the specific details of each op-mode 601.

During XR operation, an XR component may change from one op-mode 601 to another op-mode 601. For example, a HMD optical tracking system may lose the ability to perform 6-DoF head tracking due to poor conditions and thus revert to 3-DoF head tracking. In response, the HMD service that is subscribed to the use of op-modes can change its capabilities from an op-mode 601 that can support 6-DoF head tracking to an op-mode 601 that can only support 3-DoF head tracking. The corresponding XR application 501 will hear this op-mode change and decide what changes to its operation, if any, that the XR application 501 needs to perform.

As shown in FIG. 5, the XR application 501 and the XR runtime/renderer 502 can sent requests of certain op-modes 601 to, or listen for op-mode changes from, the op-mode engine 510. The op-mode engine 510 can take op-mode requests 512 from the XR application 501 or the XR runtime/renderer 502 to set particular op-modes of the XR device 508 if possible. For example, a media XR application may request Mode 3, and if the system conditions permit, the op-mode engine 510 will set this mode for the XR device 508.

The op-mode engine 510 is also responsible for setting an appropriate op-mode 601 for the XR device 508 based on the performance or system load and available power (e.g., battery levels). The op-mode engine 510 can also publish the set op-mode 601 to the XR runtime/renderer 502 and XR applications 501, so that the XR application 501 can adjust its experience accordingly. For example, if the XR application 501 requests Mode 7 (Outdoor MR), but the current system state is running under critical battery or high load (i.e., low performance), then the op-mode engine 510 can decide to only support up to Mode 5 (Room AR). The op-mode engine 510 can communicate the maximum mode of Mode 5 to the XR application 501 and the XR runtime/renderer 502, which can then adjust the experience accordingly and also inform the user.

The op-mode engine 510 can also track what features and functions of hardware components 506 are available on the XR device 508, and then control the power for certain hardware components 506 accordingly. For example, if the XR application 501 has only requested Mode 1 (HUD), then the op-mode engine 510 can control to turn off all unused hardware components 506 (e.g., the camera 506a, the sensors 506b, etc.) in order to save power. The op-mode engine 510 can also inform the XR application 501 if certain op-modes 601 are not available for a particular hardware component 506. FIG. 7 illustrates a table 700 showing some examples of how each hardware component 506 may choose to modify its behavior based on the selected op-mode 601.

In one aspect of operation, the op-mode engine 510 obtains a request for an op-mode 601 from the XR application 501 or the XR runtime/renderer 502. The op-mode engine 510 then selects a suitable op-mode 601 based at least partly on the real-time system performance of the XR device 508. The op-mode engine 510 publishes the selected op-mode 601 to the XR runtime/renderer 502 or the XR application 501. Later, the XR device 508 performs one or more tasks 514 related to image rendering, computer vision calculations, or both, for the XR application 501, using one or more algorithms associated with the selected op-mode 601.

At some point during run-time of the XR application 501, the op-mode engine 510 can detect a change of the real-time system performance of the XR device 508, such as a change in battery level, system load level, or the like. In response, the op-mode engine 510 changes the current op-mode 601 to a different op-mode 601 that is compliant with the detected change. For example, the different op-mode 601 can be a second op-mode 601 that results in less power consumption in the XR device 508 than the original op-mode 601, while maintaining a performance experience that may be inferior to a desired performance user experience, but is still acceptable to the XR application 501. Alternatively, the different op-mode 601 can be a third op-mode 601 that corresponds to a higher level of performance than the original op-mode 601.

At some point during run-time of the XR application 501, the op-mode engine 510 can identify a hardware component 506 that is unavailable to the XR device 508 or cannot be configured to support the desired performance experience. In response, the op-mode engine 510 can negotiate a different op-mode 601 with the XR application 501 for a different performance experience. Here, negotiating the different op-mode 601 can include selecting the different op-mode 601 from the list of available op-modes 601 shown in the table 600. Once the different op-mode 601 is negotiated, the XR device 508 can change a configuration, an operation, or both, of the hardware component 506. This can include, for example, turning off or on a sensor 506b, setting one or more audio or visual dimensions supported by the XR device 508, limiting one or more functions of the sensor 506b for power preservation of the XR device 508, or increasing one or more functions of the sensor 506b to increase application performance.

Although FIGS. 5 through 7 illustrates one example of a framework 500 for controlling operational modes for XR devices for performance optimization and/or power preservation and related details, various changes may be made to FIGS. 5 through 7. For example, the framework 500 could include any number of each component in any suitable arrangement. Various components in FIGS. 5 through 7 could be combined, further subdivided, or omitted and additional components could be added according to particular needs. As a particular example, the hardware components 506 could include additional or alternative hardware components. As another example, the table 600 could include other possible op-modes 601. In addition, frameworks can come in a wide variety of configurations and FIGS. 5 through 7 do not limit this disclosure to any particular framework. Also, various operations in FIGS. 5 through 7 could overlap, occur in parallel, occur in a different order, or occur any number of times.

Figure 8:
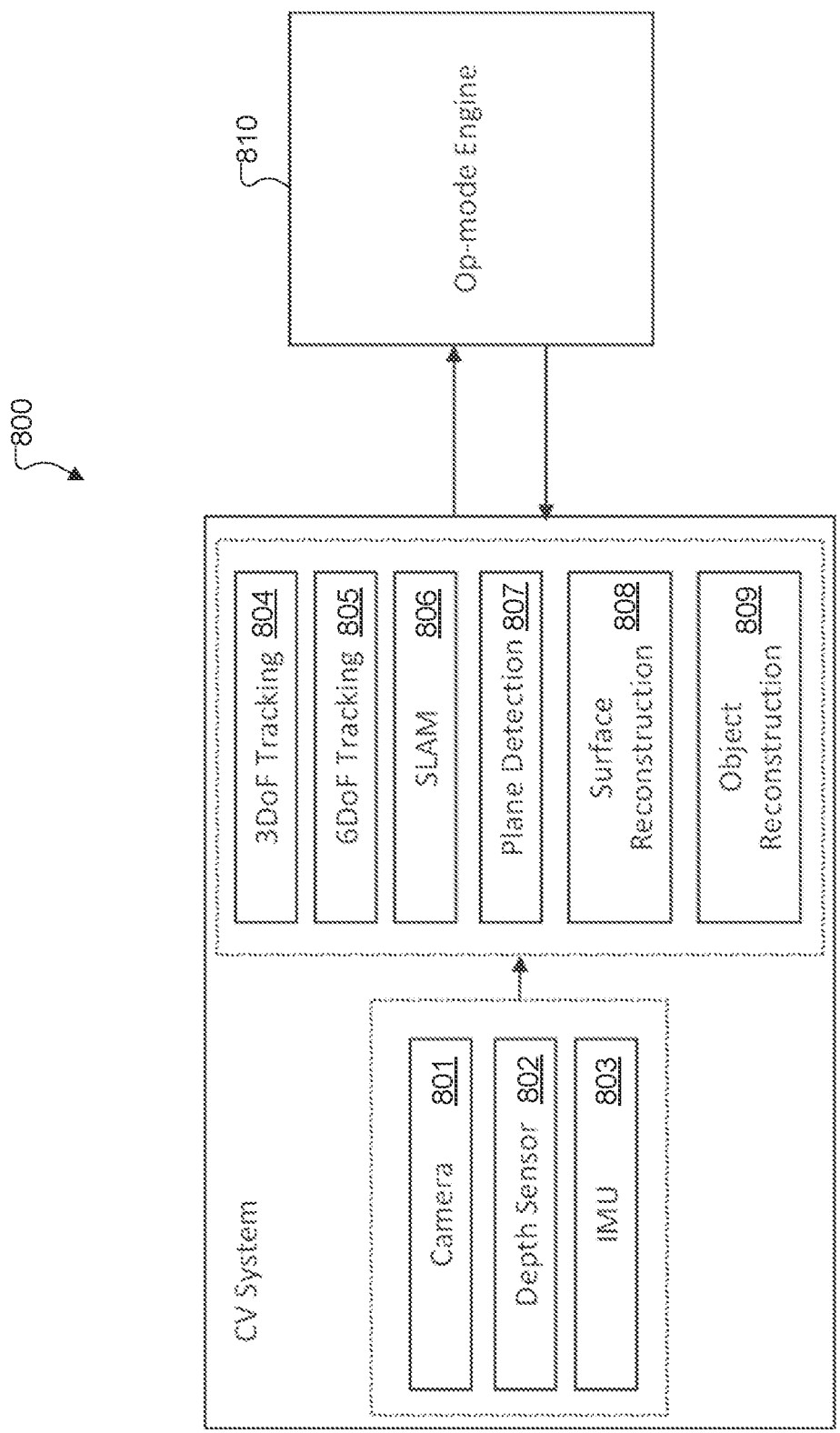
FIG. 8 illustrates an example computer vision (CV) system that is configured to control operational modes for performance optimization and/or power preservation according to this disclosure.

FIG. 8 illustrates an example computer vision (CV) system 800 that is configured to control operational modes for performance optimization and/or power preservation according to this disclosure. For ease of explanation, the CV system 800 is described as implementing the framework 500 of FIG. 5. However, this is merely one example, and the CV system 800 could be implemented using any other suitable framework.

As shown in FIG. 8, the CV system 800 includes multiple sensors 801-803, multiple software modules supporting different levels of XR tracking and scene comprehension capabilities 804-809, and an op-mode engine 810. In some embodiments, the CV system 800 is configured to support the op-modes 601 identified as Mode 1 through Mode 6 (i.e., Mode 7 is not supported by the CV system 800). Using the sensors 801 and the software modules, the CV system 800 is configured to provide the various XR capabilities 804-809, including 3-DoF tracking capability 804, 6-DoF tracking capability 805, SLAM capability 806, plane detection capability 807, surface reconstruction capability 808, and object reconstruction capability 809. In some embodiments, the CV system 800 can register with the op-mode engine 810 as an op-mode provider that supports Mode 6 and below. The CV system 800 can also register itself as a listener for op-mode changes.

In one aspect of operation, when the op-mode engine 810 determines that the current op-mode 601 is Mode 5 (Room MR) with full comprehension and tracking, the CV system 800 turns on all sensors 801-803 to enable the capabilities 802-805. If the op-mode engine 810 400 decides to change the op-mode 601 to Mode 4 (Desktop AR), the CV system 800 turns off the sensors 801 and 802, keeps the sensor 803 active and only provides the 3-DoF tracking capability 804, which is adequate for this situation.

Although FIG. 8 illustrates one example of a CV system that is configured to control operational modes for performance optimization and/or power preservation, various changes may be made to FIG. 8. For example, the CV system 800 could include any number of components in any suitable arrangement. In general, computing and communication systems come in a wide variety of configurations, and FIG. 8 does not limit the scope of this disclosure to any particular configuration.

A couple of other examples of the benefits of the disclosed embodiments are illustrative. In one example, a user is examining the mechanics of a car in a garage and his device is in Mode 5 (Room MR) to support full comprehension and tracking. When the user goes under the car, the surrounding lighting condition becomes much darker which will cause loss of 6-DoF tracking and poor scene comprehension.

Therefore, the user's device automatically switches to Mode 1 (HUD), which can still enable the user to view information on the maintenance manual.

In another example, a user is editing a document using Mode 2 (2D) on her virtual desktop. She wants to take a short break and watch some videos. As soon as she opens the video player, her device switched to Mode 3 (Media) to support the video. Resolution and frame rate can be increased, foveated rendering can be modified, but 6-DoF pose solution and sensors will be limited or turned off.

It should be noted that the various functions and operations shown and described above with respect to FIGS. 5 through 8 can be implemented in the electronic device 101 in any suitable manner. For example, in some embodiments, at least some of the functions and operations can be implemented or supported using one or more software applications or other software instructions that are executed by the processor(s) 120 of the electronic device 101. In other embodiments, at least some of the functions and operations can be implemented or supported using dedicated hardware components. In general, the functions and operations can be performed using any suitable hardware or any suitable combination of hardware and software/firmware instructions.

Figure 9:
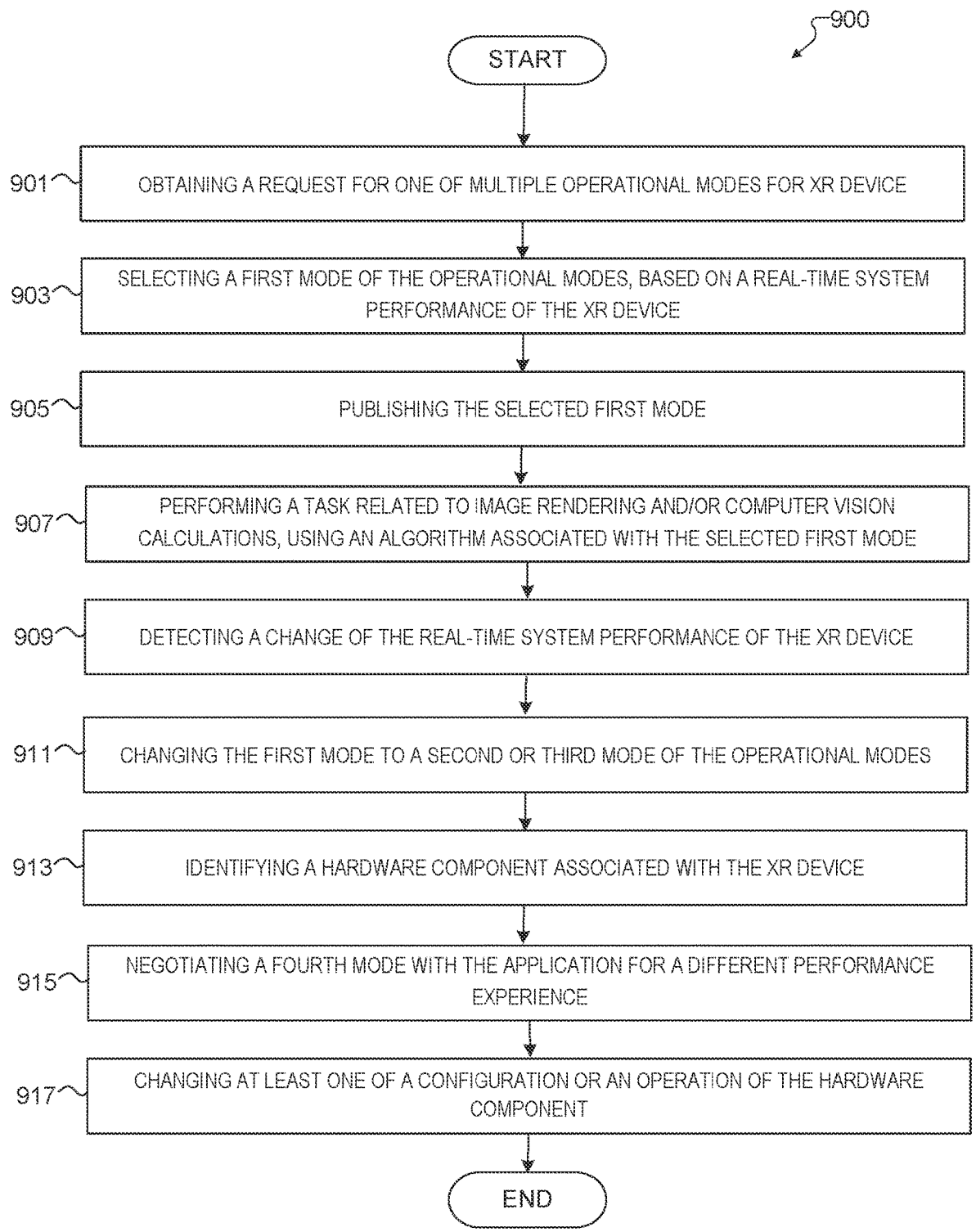
FIG. 9 illustrates an example method for controlling operational modes for XR devices for performance optimization and/or power preservation according to this disclosure.

FIG. 9 illustrates an example method 900 for controlling operational modes for XR devices for performance optimization and/or power preservation according to this disclosure. For ease of explanation, the method 900 shown in FIG. 9 is described as involving the framework 500 shown in FIG. 5. The method 900 may be performed by an electronic device, such as the electronic device 101 of FIG. 1. However, the method 900 could involve any other suitable system and be performed by any suitable device or system without departing from the scope of this disclosure.

At operation 901, the electronic device obtains a request for one of multiple operational modes from an application installed on an XR device or an XR runtime/renderer of the XR device. This can include, for example, the op-mode engine 510 obtaining a request for an op-mode 601 from the XR application 501 or the XR runtime/renderer 502.

At operation 903, the electronic device selects a first mode of the operational modes, based at least partly on a real-time system performance of the XR device. This can include, for example, the op-mode engine 510 selecting a suitable op-mode 601 based at least partly on the real-time system performance of the XR device 508.

At operation 905, the electronic device publishes the selected first mode to the XR runtime/renderer or the application. This can include, for example, the op-mode engine 510 publishing the selected op-mode 601 to the XR runtime/renderer 502 or the XR application 501.

At operation 907, the electronic device performs a task related to at least one of image rendering or computer vision calculations for the application, using an algorithm associated with the selected first mode. This can include, for example, the XR device 508 performing one or more tasks 514 related to image rendering, computer vision calculations, or both, for the XR application 501, using one or more algorithms associated with the selected op-mode 601.

At operation 909, the electronic device detects a change of the real-time system performance of the XR device. The real-time system performance can include at least one of: battery level or system load level. This can include, for example, the op-mode engine 510 detecting a change of the real-time system performance of the XR device 508, such as a change in battery level, system load level, or the like.

At operation 911, the electronic device changes the first mode to a second or third mode of the operational modes. This can include, for example, the op-mode engine 510 changing the current op-mode 601 to a different op-mode 601 that is compliant with the detected change. For example, the different op-mode 601 can be a second op-mode 601 that results in less power consumption in the XR device 508 than the original op-mode 601, while maintaining a performance experience that may be inferior to a desired performance user experience, but is still acceptable to the XR application 501. Alternatively, the different op-mode 601 can be a third op-mode 601 that corresponds to a higher level of performance than the original op-mode 601.

At operation 913, the electronic device identifies a hardware component associated with the XR device, where the hardware component is unavailable to the XR device or cannot be configured to support the desired performance experience. This can include, for example, the op-mode engine 510 identifying a hardware component 506 that is unavailable to the XR device 508 or cannot be configured to support the desired performance experience.

At operation 915, the electronic device negotiates a fourth mode with the application for a different performance experience. This can include, for example, the op-mode engine 510 negotiating a different op-mode 601 with the XR application 501 for a different performance experience. Here, negotiating the different op-mode 601 can include selecting the different op-mode 601 from the list of available op-modes 601 shown in the table 600.

At operation 917, the electronic device changes at least one of a configuration or an operation of the hardware component. This can include, for example, the XR device 508 changing a configuration, an operation, or both, of the hardware component 506.

Although FIG. 9 illustrates one example of a method 900 for controlling operational modes for XR devices for performance optimization and/or power preservation according to this disclosure, various changes can be made to FIG. 9. For example, various steps in FIG. 9 could overlap, occur in parallel, occur serially, occur in a different order, or occur any number of times. Also, the steps of the method 900 could be implemented in any suitable manner, such as entirely within the electronic device 101 or using a combination of devices. For instance, the electronic device 101 could collect data and provide the data to a server 106, which could then process the data and generate any suitable output.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining a request for one of multiple operational modes from an extended reality (XR) application installed on an XR device or an XR runtime/renderer of the XR device;
responsive to the request, selecting a first mode of the operational modes based at least partly on a real-time system performance of the XR device;
publishing the selected first mode to the XR runtime/renderer or the XR application; and
performing a task related to at least one of image rendering or computer vision calculations for the XR application using an algorithm associated with the selected first mode.

2. The method of claim 1, wherein the operational modes are standardized for use in multiple applications, algorithms, and components associated with the XR device.

3. The method of claim 1, wherein the operational modes define power and performance quality management for multiple tasks related to the at least one of image rendering or computer vision calculations in an XR system.

4. The method of claim 1, further comprising:
detecting a change of the real-time system performance of the XR device, wherein the real-time system performance includes at least one of: battery level or system load level; and
based on the detected change, at least one of:
changing the first mode to a second mode of the operational modes, wherein the second mode consumes less power than the first mode while maintaining a performance experience inferior to a desired performance experience but acceptable to the XR application; or
changing the first mode to a third mode of the operational modes, wherein the third mode corresponds to a higher level of performance than the first mode.

5. The method of claim 4, further comprising:
identifying a hardware component associated with the XR device, wherein the hardware component is unavailable to the XR device or cannot be configured to support the desired performance experience;
negotiating a fourth mode with the XR application for a different performance experience; and
changing at least one of a configuration or an operation of the hardware component.

6. The method of claim 5, wherein negotiating the fourth mode includes selecting the fourth mode from the multiple operational modes.

7. The method of claim 5, wherein changing the at least one of the configuration or the operation of the hardware component includes at least one of:
turning off or on a sensor coupled to the XR device,
setting one or more audio or visual dimensions supported by the XR device,
limiting one or more functions of the sensor for power preservation of the XR device, or
increasing one or more functions of the sensor to increase application performance.

8. An electronic device comprising:
at least one memory configured to store instructions; and
at least one processor configured when executing the instructions to:
obtain a request for one of multiple operational modes from an extended reality (XR) application installed on an XR device or an XR runtime/renderer of the XR device;
responsive to the request, select a first mode of the operational modes based at least partly on a real-time system performance of the XR device;
publish the selected first mode to the XR runtime/renderer or the XR application; and
perform a task related to at least one of image rendering or computer vision calculations for the XR application using an algorithm associated with the selected first mode.

9. The electronic device of claim 8, wherein the operational modes are standardized for use in multiple applications, algorithms, and components associated with the XR device.

10. The electronic device of claim 8, wherein the operational modes define power and performance quality management for multiple tasks related to the at least one of image rendering or computer vision calculations in an XR system.

11. The electronic device of claim 8, wherein the at least one processor is further configured to:
detect a change of the real-time system performance of the XR device, wherein the real-time system performance includes at least one of: battery level or system load level; and
based on the detected change, at least one of:
change the first mode to a second mode of the operational modes, wherein the second mode consumes less power than the first mode while maintaining a performance experience inferior to a desired performance experience but acceptable to the XR application; or
change the first mode to a third mode of the operational modes, wherein the third mode corresponds to a higher level of performance than the first mode.

12. The electronic device of claim 11, wherein the at least one processor is further configured to:
identify a hardware component associated with the XR device, wherein the hardware component is unavailable to the XR device or cannot be configured to support the desired performance experience;
negotiate a fourth mode with the XR application for a different performance experience; and
change at least one of a configuration or an operation of the hardware component.

13. The electronic device of claim 12, wherein, to negotiate the fourth mode, the at least one processor is configured to select the fourth mode from the multiple operational modes.

14. The electronic device of claim 12, wherein, to change the at least one of the configuration or the operation of the hardware component, the at least one processor is configured to at least one of:
turn off or on a sensor coupled to the XR device,
set one or more audio or visual dimensions supported by the XR device,
limit one or more functions of the sensor for power preservation of the XR device, or
increase one or more functions of the sensor to increase application performance.

15. A non-transitory computer readable medium containing computer readable program code that, when executed, causes at least one processor of an electronic device to:
obtain a request for one of multiple operational modes from an extended reality (XR) application installed on an XR device or an XR runtime/renderer of the XR device;
responsive to the request, select a first mode of the operational modes based at least partly on a real-time system performance of the XR device;
publish the selected first mode to the XR runtime/renderer or the XR application; and
perform a task related to at least one of image rendering or computer vision calculations for the XR application using an algorithm associated with the selected first mode.

16. The non-transitory computer readable medium of claim 15, wherein the operational modes are standardized for use in multiple applications, algorithms, and components associated with the XR device.

17. The non-transitory computer readable medium of claim 15, wherein the operational modes define power and performance quality management for multiple tasks related to the at least one of image rendering or computer vision calculations in an XR system.

18. The non-transitory computer readable medium of claim 15, wherein the computer readable program code, when executed, further causes the at least one processor to:
   detect a change of the real-time system performance of the XR device, wherein the real-time system performance includes at least one of: battery level or system load level; and
   based on the detected change, at least one of:
      change the first mode to a second mode of the operational modes, wherein the second mode consumes less power than the first mode while maintaining a performance experience inferior to a desired performance experience but acceptable to the XR application; or
      change the first mode to a third mode of the operational modes, wherein the third mode corresponds to a higher level of performance than the first mode.

19. The non-transitory computer readable medium of claim 18, wherein the computer readable program code, when executed, further causes the at least one processor to:
   identify a hardware component associated with the XR device, wherein the hardware component is unavailable to the XR device or cannot be configured to support the desired performance experience;
   negotiate a fourth mode with the XR application for a different performance experience; and
   change at least one of a configuration or an operation of the hardware component.

20. The non-transitory computer readable medium of claim 19, wherein the computer readable program code that, when executed, causes the at least one processor to negotiate the fourth mode comprises:
   computer readable program code that, when executed, causes the at least one processor to select the fourth mode from the multiple operational modes.

* * * * *